INVENTORS
WILLIAM W. BURMEISTER
RICHARD K. RADTKE
BY
ATTORNEY

INVENTORS
WILLIAM W. BURMEISTER
RICHARD K. RADTKE
BY
ATTORNEY

United States Patent Office 3,259,822
Patented July 5, 1966

3,259,822
GIMBAL ERROR CORRECTED GYROSCOPIC SYSTEM
William W. Burmeister and Richard K. Radtke, Phoenix, Ariz., assignors to Sperry Rand Corporation, Great Neck, N.Y., a corporation of Delaware
Filed Sept. 13, 1963, Ser. No. 308,835
6 Claims. (Cl. 318—30)

This invention relates to gyroscopic data transmission systems and to compensating means associated therewith for compensating the output signal for errors due to the gimbal configuration and attitude of the gyroscope. This invention is particularly applicable to aircraft gyromagnetic compass systems.

It is common in aircraft compass systems of the type utilizing a directional gyroscope for the indicated heading of the aircraft to be in error when the attitude of the aircraft is other than level. This is caused by the gimbal configuration of the directional gyroscope and it is known as gimbal error. The gimbal error increases as the aircraft attitude varies from level. For example, as an aircraft increases its roll attitude, the gimbal error increases to such an extent that for a roll angle of 60° and zero pitch angle the gimbal error may be approximately 20°. When the aircraft is other than level about one axis, the gimbal error appears as a two cycle error in the associated data transmission system. The characteristics of two cycle error are explained in U.S. Patent 2,700,745, entitled Data Transmission System and Corrector Therefor, invented by Depp et al. and issued January 25, 1955.

Previous attempts to correct for gimbal error in gyroscopic data transmission systems have usually involved roll or pitch stabilization of the directional gyro. These attempts are extremely complex in their mechanization and furthermore they are not readily adaptable to existing gyroscopic data transmission systems.

It is a primary object of the present invention to provide a gyroscopic data transmission system having gimbal error correction means which simply and accurately compensates for gimbal error.

It is a further object of the present invention to provide a gimbal error compensating means which can be readily adapted to existing gyroscopic data transmission systems.

The above objects are accomplished by inserting a variable impedance means in one leg of a synchro transmitter that is mounted on a first gyroscope whose gimbal error signal is to be corrected. An attitude signal representative of the attitude of the first gyroscope is provided, for example, from a second gyroscope. The attitude signal is connected to control the variable impedance means to provide a compensating signal in the data transmission system associated with the transmitter which effectively compensates for the gimbal error. The variable impedance is provided by the secondary of a transformer which has its primary connected in the collector circuit of a transistor. By varying the bias to the transistor in accordance with a function of the attitude signal, the secondary impedance of the transformer provides the required variable impedance.

Referring to the drawings.

The present invention will be described for purposes of example with respect to correcting the gimbal error in an aircraft gyroscopic compass system of the type generally shown in U.S. Patent No. 2,357,319, entitled Flux Valve Magnetic Compass issued September 5, 1944 to Esval et al. However, it will be appreciated that this method of compensation is equally applicable to correct the output of any gyro gimbal or Hooke's joint configuration related by the formula, the tangent of the output angle equals a cosine function times the tangent of the true angle, such as the roll output of a vertical gyro on an inclined panel.

The heading of an aircraft is defined as the angular direction of the longitudinal axis of the aircraft with respect to some fixed direction, usually north. Due to gimbal error when the aircraft is other than level, the synchro transmitter mounted on a directional gyro transmits a heading signal which differs from the actual heading in accordance with the equation:

$$\tan G_o = \tan \gamma \cos \phi \sec \theta - \tan \theta \sin \phi \qquad (1)$$

where $G_o$ = heading transmitted by gyro
$\gamma$ = actual aircraft heading
$\phi$ = aircraft roll angle
$\theta$ = aircraft pitch angle
($G_o$ and $\gamma$ are relative to the gyro spin axis)

If the aircraft pitch angle is assumed to be zero, the transmitted heading becomes:

$$\tan G_o = \tan \gamma \cos \phi \qquad (2)$$

Defining the gimbal heading error as:

$$E_g = G_o - \gamma \qquad (3)$$

the equation of the gimbal error is:

$$\tan E_g = \tan \gamma \frac{(\cos \phi - 1)}{1 + \tan^2 \gamma \cos \phi} \qquad (4)$$

Figure 1:
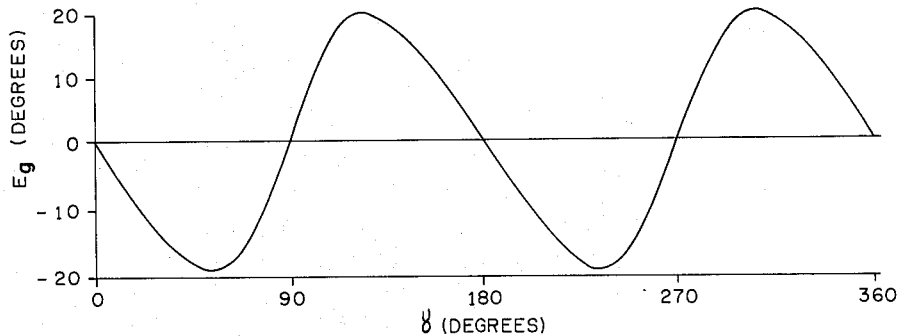
FIG. 1 is a graph of the gimbal heading error $E_g$ versus actual aircraft heading for a bank angle of 60°.

Plotting this equation on coordinates of $E_g$ versus $\gamma$ shows the gimbal error to be a two cycle error for any given value of bank angle $\phi$. A typical plot is shown in FIG. 1 for a bank angle of 60° and zero pitch angle.

Figure 2:
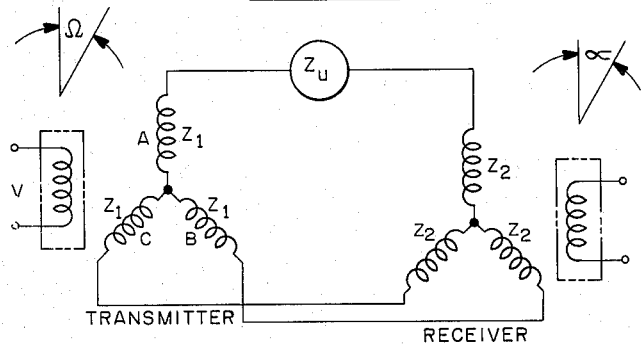
FIG. 2 is a schematic wiring diagram of a synchro data transmission system having an unbalanced impedance in one portion thereof.

Referring now to FIG. 2, if the impedance of one leg of a synchro transmitter is unbalanced, the angle of the resultant flux at the receiver is related to that at the transmitter by the equation:

$$\tan \Omega = \tan \alpha \frac{3Z_t}{3Z_t + 2Z_u} \qquad (5)$$

where $\alpha$ = received angle,
$\Omega$ = transmitted angle,
$Z_t = Z_1 + Z_2$ = the sum of the impedance of one leg of the transmitting synchro and the impedance of one leg of the receiving synchro, and
$Z_u$ = the unbalancing impedance introduced between one pair of corresponding legs of the transmitting and receiving synchros.

Substituting the above equation provides:

$$\tan (E_s) = \frac{\tan \alpha (1-p)}{1 + p \tan^2 \alpha} \qquad (6)$$

where $E_s$ = synchro error = $\Omega - \alpha$ and $$p = \frac{3Z_t}{3Z_t + 2Z_u}$$

Figure 3:
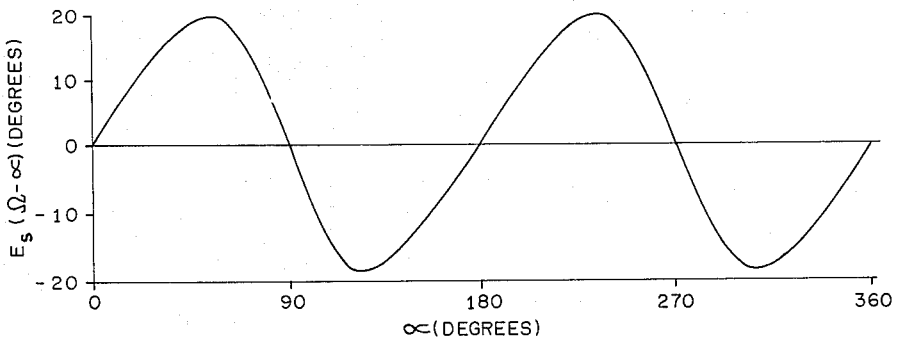
FIG. 3 is a graph of the unbalancing impedance error $E_s$ versus transmitted heading $\Omega$.

A plot of this error versus received heading ($\alpha$) is shown in FIG. 3.

If the transmitting synchro mounted on a directional gyroscope is aligned such that a null exists across legs B and C when the spin axis is aligned with the longitudinal axis of the aircraft, $\Omega = G_o$ and Equation 5 becomes:

$$\tan G_o = p \tan \alpha \quad (7)$$

Combining with Equation 2, $$p \tan \alpha = \tan \gamma \cos \phi \quad (8)$$

In order to correct the gimbal error, $$\tan \alpha = \tan \gamma, \text{ and } p = \cos \phi = \frac{3Z_t}{3Z_t + 2Z_u} \quad (9)$$

from which $$Z_u = \tfrac{3}{2}Z (\sec \phi - 1) \quad (10)$$

Equation 10 defines the value of impedance necessary for a given roll angle in order to compensate for the gimbal error. The spin axis, synchro null and aircraft longitudinal axis alignment are necessary for proper operation of the system.

The system described above may be extended to compensation for gimbal error due to aircraft pitch angle ($\theta$) by nulling the B and C synchro legs when the gyro spin axis is aligned with the lateral axis of the aircraft. The equation then becomes:

$$\tan G_o = \tan \gamma \cos \theta \text{ (gimbal error)} \quad (11)$$

$$\tan G_o = p \tan \alpha \text{ (synchro)} \quad (12)$$

which combine to give:

$$p \tan \alpha = \tan \gamma \cos \theta \quad (13)$$

from which $$p = \cos \theta \quad (14)$$

and $$Z_u = \tfrac{3}{2}Z_t (\sec \theta - 1) \quad (15)$$

Figure 4:
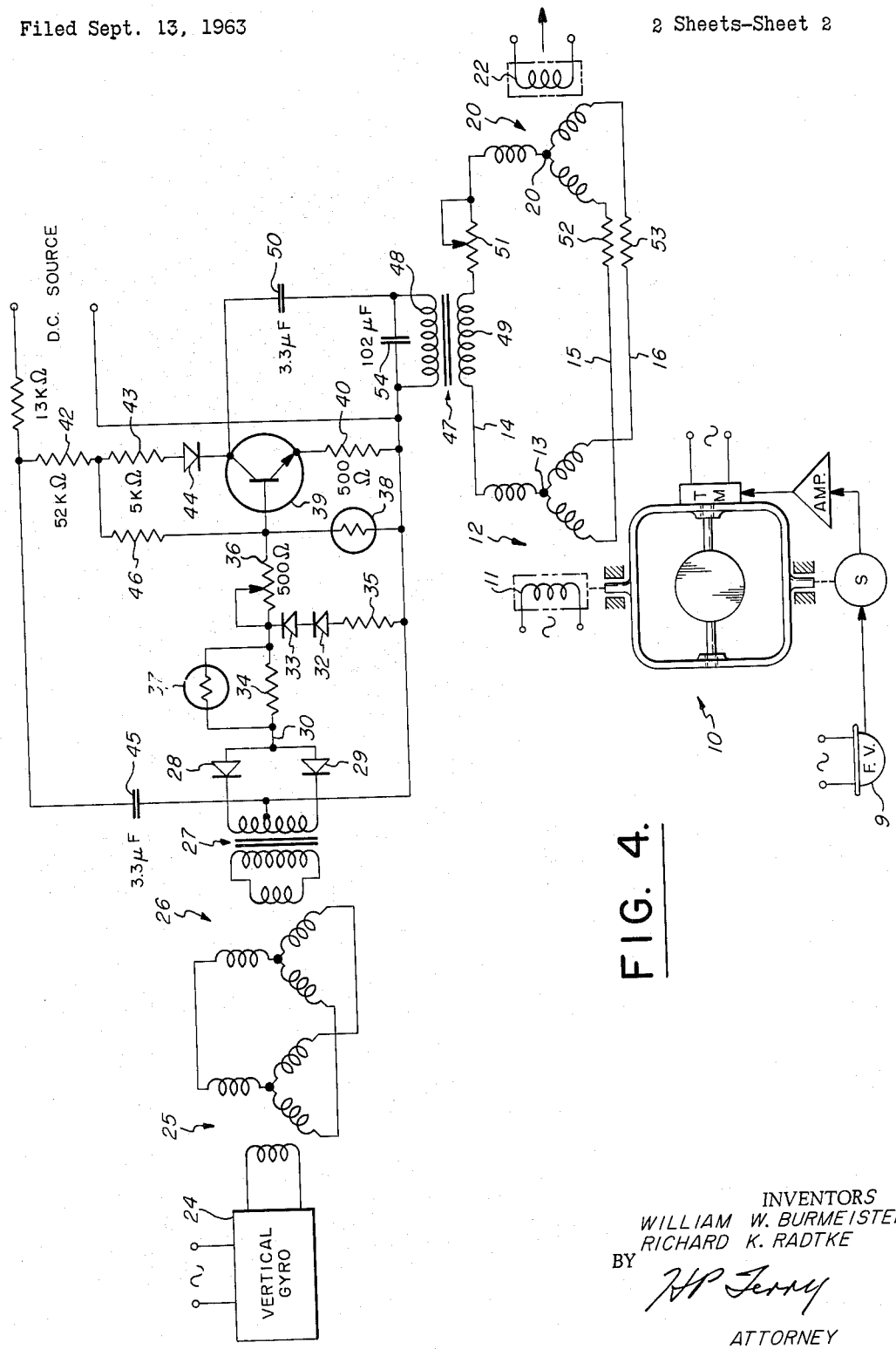
FIG. 4 is a schematic diagram showing a gyromagnetic compass system utilizing the present invention.

In accordance with the present invention to correct for gimbal error due to aircraft roll angle, as shown in FIG. 4, a circuit is responsive to the roll output of a vertical gyro to vary an impedance which is located in series in one leg of the transmitting synchro mounted on the directional gyro. A directional gyro 10 has its spin axis slaved in a conventional manner by means of a flux valve 9 which senses the earth's magnetic field in a manner, for example, as disclosed in said U.S. Patent 2,357,- 319. The rotor 11 of a synchro transmitter 12 is mounted on the vertical trunnion of the directional gyro 10 and energized by a suitable alternating power source. The Y-connected legs of the stator 13 of the transmitter 12 are connected in multi-circuit fashion by leads 14, 15 and 16 to the respective Y-connected legs of the stator 20 of a synchro receiver 21. In the absence of the present invention, the output signal from the rotor 22 of the synchro receiver 21 would be representative of the output signal from the synchro transmitter 12 and would therefore include a gimbal error, as explained above, when the aircraft is in a banked attitude.

A vertical gyro 24 is also mounted in the aircraft in which the directional gyro 10 is mounted. The vertical gyro 24 provides a signal from its roll synchro transmitter pick-off 25 representative of the roll attitude of the aircraft and thus the roll attitude of the directional gyro 10.

The roll signals provided by the roll synchro 25 of the vertical gyro 24 are transmitted to a synchro receiver 26. The secondary winding of the synchro 26 provides a roll output signal proportional to the sine of the angle of roll $\phi$. This signal is applied to the primary winding of a roll-input transformer 27. The secondary winding of the transformer 27 is center-tapped, and constitutes, in conjunction with diode rectifiers 28 and 29, a conventional full-wave rectifier circuit, developing a rectified version of its input between terminals 30 and 31. The signal developed in this way is thus a D.-C. control signal representing in magnitude the sine of the angle of roll of the aircraft.

This D.-C. control signal is transmitted through a signal-shaping circuit consisting of diodes 32 and 33, resistors 34 and 35, variable resistor 36, and thermistors 37 and 38, to be applied between the base of a transistor 39 to the ground. The emitter of the transistor 39 is connected to ground through an emitter resistor 40. The transistor circuit is energized from a D.-C. source whose negative leg is grounded, the positive leg being connected to the collector of the transistor through a decoupling resistor 41, resistors 42 and 43, and diode rectifier 44. The junction between resistors 41 and 42 is connected to ground through decoupling capacitor 45. The decoupling desistor 41 and the decoupling capacitor 45 form a decoupling filter. Negative feedback between the collector circuit and the base of the transistor 39 is provided through a feedback resistor 46.

The operation of the transistor 39 may be adversely affected by the voltage reflected from the secondary circuit of the transformer 47 back into its primary 48. This effect is minimized by the diode 44 which rectifies the negative going excursions of these voltages. The above-described circuit operates to vary the impedance in the leg 14 of the heading synchro data transmission system by means of a transformer 47 which has its primary winding 48 connected to the above-described circuit and its secondary winding 49 connected in the leg 14 between the synchros 12 and 21. The magnitude of the impedance of the secondary winding 49 depends upon the impedance connected to the primary winding 48. The primary winding 48 is connected through a direct-current blocking capacitor 50 between the collector of the transistor 39 and ground.

The circuit operates by virtue of the fact that the A.-C. conductance of the internal collector-to-emitter circuit of the transistor 39 depends upon the potential of its base. Thus, the base potential determines the magnitude of the load impedance connected across the primary winding 48 of the transformer 47 and therefore the magnitude of the effective impedance constituted by the secondary winding 49 connected in the leg 14 of the heading synchro data transmission system, since the transformed secondary output impedance is directly related to the primary impedance by the square of the turn ratio.

A variable resistor 51 may be connected in the leg 14 to compensate for variations in transformed output impedance in which event resistors 52 and 53 are connected in the legs 52 and 53 respectively to balance the other two synchro legs to that of the impedance of the leg 14.

The circuit is arranged so that, in the absence of an input roll signal, the combination of the transistor 39 and the capacitor 50 constitutes a short circuit for alternating current at 400 cycles per second which is the operating frequency of the heading synchro data transmission system. The effective impedance connected in the line 14 is therefore zero; the transmission system is therefore correctly balanced when the aircraft is level. When the aircraft is rolled, the roll input circuit makes the potential of the base of the transistor 39 more negative than before. The circuit is arranged so that this reduces the effective A.-C. conductance of the internal collector-to-emitter circuit of the transistor 39 and increases its impedance. Therefore an effective impedance is introduced into the line 14 by the transformer 47. Since the transformed output impedance is directly related to the primary impedance by the square of the turn ratio, the output impedance will also increase and thereby correct for the effects of the gimbal error. The magnitude of this impedance increases with the roll angle in a manner dependent on the roll-signal shaping circuit, on the characteristics of the transistor 39, on the standing voltage of the transistor electrodes, and on the feedback ratio determined by resistors 42, 43 and 46. These quantities and also the value of the capacitor 54 which is connected across the primary winding 48 of transformer 47 and serves to tune the leakage inductance of the transformer, can be adjusted experimentally to make the effective impedance as measured experimentally vary in the desired manner as a function of the roll angle.

The electrical values of the components as shown in FIG. 4 were found suitable in conjunction with standard synchro transmission components, using a transistor type 2N657 as transistor 39. Final adjustments, including that of choosing a suitable resistance value for resistor 46 can be made to insure that the overall operation of the transmission system is such that the correction introduced as a function of roll differs very little, over a desired operating range, from the correct value.

In the circuit of FIG. 4 the thermistors 37 and 38 are employed to compensate for possible variations of other circuit constants with temperature so as to stabilize the performance of the system in response to temperature changes. Clearly, such compensations may be effected in other ways. The presence of the resistor 40 also serves to stabilize the performance by increasing the emitter circuit resistance.

The systems above-described introduce adequate corrections for most purposes, provided that correction is required for errors resulting only from angles of roll of the aircraft not exceeding 60°. However, if greater accuracy in making corrections is required, or if corrections are required for gimballing errors due to larger angles of roll, then it may become necessary to introduce refinements of the system. If a more accurate analysis of the corrections introduced into the transmission system, in response to the introduction of impedances, is carried out, it will be seen that corrections depend not only on the magnitudes of the inductive components of the impedances of the circuit elements but also on the resistive components of the impedances. It may then become desirable to effect corrections for gimballing errors by introducing, in series in the transmission system, impedances that are varied both in respect of the inductive and the resistive component of the impedances introduced. In the system of FIG. 4, an improved performance may result by connecting not only the tuning capacitor 54 of the primary winding 48 of the transformer 47, but also a resistor (possibly a non-linear resistor), and appropriately adjusting the relative magnitudes of these two components. Furthermore, more elaborate shaping circuits may be employed to make the D.-C. control signal applied to the base of the transistor 39 vary with the roll angle in a more complex manner to meet more stringent requirements for performance.

While the invention has been described in its preferred embodiments, it is understood that the words which have been used are words of description rather than limitation and that changes within the purview of the appended claims may be made without departing from the true scope and spirit of the invention in its broader aspects.

What is claimed is:

1. In a gyroscopic data transmission system,
   (a) a gyroscope,
   (b) data transmission means including a transmitter connected to said gyroscope, a receiver and a connecting circuit connected in multi-circuit fashion between said transmitter and receiver, said transmitter being adapted to provide an output signal representative of the relative position of said gyroscope which signal is normally in error dependent upon the gimbal configuration and the attitude of the gyroscope,
   (c) means for providing an attitude signal representative of the attitude of said gyroscope,
   (d) and electrical circuit means responsive to said attitude signal and coupled to a portion of said data transmission means for providing a compensating signal which effectively compensates for said error due to the gimbal configuration and attitude of the gyroscope, the impedance of said electrical circuit means being variable in response to changes in said attitude signal by virtue of the fact that said circuit includes a multi-electrode electronic device which itself presents, between a first pair of its electrodes, an impedance to current flow internally of the device between these electrodes that may be varied by varying a potential difference applied between a second pair of its electrodes connected to receive said attitude signal.

2. In a gyroscope data transmission system
   (a) a directional gyroscope,
   (b) data transmission means including a transmitter connected to said directional gyroscope, a receiver and a connecting circuit connected in multi-circuit fashion between said transmitter and receiver, said transmitter being adapted to provide an output signal representative of the relative position of said directional gyroscope which signal is normally in error dependent upon the gimbal configuration and the attitude of said directional gyroscope,
   (c) vertical gyroscopic means including means for providing an attitude signal representative of the attitude of said directional gyroscope,
   (d) and electrical circuit means responsive to said attitude signal and coupled to a portion of said data transmission means for providing a compensating signal which effectively compensates for said error due to the gimbal configuration and attitude of said directional gyroscope, the impedance of said electrical circuit means being variable in response to changes in said attitude signal by virtue of the fact that said circuit includes a multi-electrode electronic device which itself presents, between a first pair of its electrodes an impedance to current flow internally of the device between these electrodes that may be varied by varying a potential difference applied between a second pair of its electrodes connected to receive said attitude signal, said circuit being so constructed and arranged that the impedance presented by it in said transmission means is a predetermined function of said attitude signal.

3. In a gyroscopic data transmission system
   (a) a directional gyroscope,
   (b) data transmission means including a synchro transmitter connected to said directional gyroscope, a synchro receiver and a connecting circuit connected in multi-lead fashion between said transmitter and receiver, said transmitter being adapted to provide an output signal representative of the relative position of said directional gyroscope which sgnal is normally in error dependent upon the gimbal configuration and the attitude of said directional gyroscope,
   (c) vertical gyroscopic means including means for providing an attitude signal representative of the attitude of said directional gyroscope,
   (d) and electrical circuit means responsive to said attitude signal and coupled to one lead of said data transmission means for providing a compensating signal which effectively compensates for said error due to the gimbal configuration and attitude of the gyroscope, the impedance of said electrical circuit means being variable in response to changes in its input signal by virtue of the fact that said circuit includes a multi-electrode electronic device which itself presents between a first pair of its electrodes an impedance to current flow internally of the device between these electrodes that may be varied by varying a potential difference applied between a second pair of its electrodes, said second pair of said electrodes being connected to receive said attitude signal, said circuit being so constructed and arranged that the impedance presented by it in said transmission means is a predetermined function of said attitude signal, said circuit being so constructed and arranged that in the absence of said attitude signal said electronic device constitutes an effective short circuit in order that said circuit constitutes an impedance of zero magnitude connected in said transmission means and with said attitude signal applied to said electronic device an impedance is provided that is predetermined function of said attitude signal.

4. In a system of the character described in claim 3, wherein said circuit further includes non-linear means so constructed and arranged that the internal impedance of said electronic device varies in response to a change in said attitude signal at an increasing rate as said attitude signal increases.

5. A gyroscopic system comprising
   (a) a primary gyroscope having a direction-defining member mounted with two degrees of freedom of angular motion with respect to an outer support by means of a gimbal ring,
   (b) a data transmission system having a data transmitter coupled to said gimbal ring for transmitting data signals dependent on the angle measured about the outer gimbal axis of the gimbal ring between a primary reference direction defined by said direction-defining member and a secondary reference direction defined by said outer support and a data receiver connected to receive data signals from said data transmitter for producing signals which in the absence of correction is dependent upon said angle and includes a gimbal error factor, and
   (c) gimbal error correction means connected in said data transmission system between said data transmitter and said data receiver for modifying the signals received by said data receiver in order that said data receiver provides signals representative of the angle between said two reference directions measured not about the outer gimbal axis but about a different axis, said gimbal error correction means including electrical circuit means having a multi-electrode electronic device which itself presents, between a first pair of its electrodes an impedance to current flow internally of the device between these electrodes that may be varied by varying a potential difference applied between a second pair of its electrodes, said second pair of said electrodes being connected to receive a signal defining the angle between said outer gimbal axis and said difference axis for producing a control signal representative of the magnitude of said angle between said two axes and means responsive to said control signal for modifying the signals transmitted from said data transmitter to said data receiver to compensate for said gimbal error factor.

6. Gyroscopic apparatus for aircraft for providing a signal representative of the heading of said aircraft, which signal is free from gimbal error, comprising,
   (a) a directional gyroscope having an outer support, a gimbal ring mounted for rotation about an outer gimbal axis and a direction-defining member pivotally mounted in said gimbal ring with freedom of angular movement about an inner gimbal axis, said outer support member arranged to be mounted in said aircraft with said outer gimbal axis substantially parallel to the aircraft's vertical axis, and said direction-defining member being provided with gyroscopic means operative to maintain said direction-defining member oriented so that a first reference direction defined therein remains parallel to a fixed horizontal position,
   (b) a data transmission system having a data transmitter connected to be driven by said gimbal ring for transmitting data signals dependent on the angular position of said gimbal ring in relation to said outer support and a data receiver connected to receive data signals from said data transmitter and being operative, in the absence of corrections, to respond to the data signals received by providing signals which, in the absence of correction, represent the angle measured about the outer gimbal axis between the gimbal ring and a secondary reference direction parallel to the fore and aft axis of said aircraft thereby representing the heading of the aircraft correctly when level but being subject to a gimbal error when the aircraft is inclined to the horizontal, and
   (c) gimbal error correction means connected to said data transmission system for modifying the data signals transmitted therethrough including means for receiving an input signal representative of the inclination angle between said outer gimbal axis and the direction of the vertical for providing a control signal and further including means responsive to said control signal for modifying the signals transmitted by said data transmitter as a function of said inclination angle in such a way that the data receiver produces at its output a signal representative of the true heading of the aircraft defined as the angle measured about the vertical axis between the primary reference and the secondary reference and defined in relation to the support and further including a multi-electrode electronic device which itself presents, between a first pair of its electrodes an impedance to current flow internally of the device between these electrodes that may be varied by varying a potential difference applied between a second pair of its electrodes, said second pair of said electrodes being connected to receive a signal defining the angle between said outer gimbal axis and said difference axis for producing a control signal representative of the magnitude of said angle between said two axes and means responsive to said control signal for modifying the signals transmitted from said data transmitter to said data receiver to compensate for said gimbal error.

No references cited.

JOHN F. COUCH, *Primary Examiner.*